United States Patent
Zhang et al.

(10) Patent No.: US 12,236,159 B2
(45) Date of Patent: Feb. 25, 2025

(54) METHOD AND APPARATUS FOR SYNCHRONIZING AUDIO AND TEXT, READABLE MEDIUM, AND ELECTRONIC DEVICE

(71) Applicant: BEIJING BYTEDANCE NETWORK TECHNOLOGY CO., LTD., Beijing (CN)

(72) Inventors: Weiwei Zhang, Beijing (CN); Dongyu Chen, Beijing (CN); Huapeng Yang, Beijing (CN); Jiafeng Zheng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 52 days.

(21) Appl. No.: 17/928,573

(22) PCT Filed: Oct. 29, 2021

(86) PCT No.: PCT/CN2021/127303
§ 371 (c)(1),
(2) Date: Nov. 29, 2022

(87) PCT Pub. No.: WO2022/111206
PCT Pub. Date: Jun. 2, 2022

(65) Prior Publication Data
US 2023/0229382 A1    Jul. 20, 2023

(30) Foreign Application Priority Data
Nov. 26, 2020   (CN) .......................... 202011355859.6

(51) Int. Cl.
*G06F 3/16*       (2006.01)
*G11B 27/10*      (2006.01)

(52) U.S. Cl.
CPC .............. *G06F 3/165* (2013.01); *G11B 27/10* (2013.01)

(58) Field of Classification Search
CPC ............................... G06F 3/165; G11B 27/10
See application file for complete search history.

(56) References Cited

U.S. PATENT DOCUMENTS

| 8,290,777 B1 | 10/2012 | Nguyen et al. |
| 2002/0002458 A1 | 1/2002 | Owen et al. |
(Continued)

FOREIGN PATENT DOCUMENTS

| CN | 1091567 A | 8/1994 |
| CN | 1279805 A | 1/2001 |
(Continued)

OTHER PUBLICATIONS

International Patent Application No. PCT/CN2021/127303; Int'l Search Report; dated Jan. 5, 2022; 2 pages.
(Continued)

*Primary Examiner* — Sherrod L Keaton
(74) *Attorney, Agent, or Firm* — BakerHostetler

(57) ABSTRACT

This disclosure relates to a method and apparatus for synchronizing audio and text, a readable medium, and an electronic device, and relates to the technical field of electronic information, the method including: in response to a first page displayed on a presentation interface being updated to a second page, determining whether the second page includes multimedia content, wherein audio corresponding to text in the first page is played while the first page is displayed; if the second page includes the multimedia content and the multimedia content is in a mute playing state, controlling the audio to be played continuously; determining a first playing identification of the audio when the playing of the multimedia content is stopped, and determin-
(Continued)

(a)

(b)

ing corresponding target text in accordance with the first playing identification; and updating the second page to a third page on the presentation interface, the third page including the target text.

19 Claims, 13 Drawing Sheets

(56) References Cited

U.S. PATENT DOCUMENTS

| | | | |
|---|---|---|---|
| 2012/0036429 | A1 | 2/2012 | Ajima |
| 2014/0189501 | A1* | 7/2014 | Demiralp ............... G06F 40/134 715/764 |
| 2015/0213839 | A1 | 7/2015 | Woodman et al. |
| 2015/0340038 | A1 | 11/2015 | Dzik et al. |
| 2018/0032305 | A1 | 2/2018 | Cameron et al. |
| 2019/0196675 | A1* | 6/2019 | German ................. G06V 30/40 |

FOREIGN PATENT DOCUMENTS

| | | |
|---|---|---|
| CN | 1379345 A | 11/2002 |
| CN | 1385030 A | 12/2002 |
| CN | 1595397 A | 3/2005 |
| CN | 101383937 A | 3/2009 |
| CN | 102842326 A | 12/2012 |
| CN | 103365533 A | 10/2013 |
| CN | 104662604 A | 5/2015 |
| CN | 105763925 A | 7/2016 |
| CN | 106777099 A | 5/2017 |
| CN | 108462892 A | 8/2018 |
| CN | 108512874 A | 9/2018 |
| CN | 109766305 A | 5/2019 |
| CN | 109889859 A | 6/2019 |
| CN | 110677689 A | 1/2020 |
| CN | 111970257 A | 11/2020 |
| EP | 3276623 A1 | 1/2018 |
| EP | 3285188 A1 | 2/2018 |
| JP | 2009-059317 A | 3/2009 |
| JP | 2013-008357 A | 1/2013 |
| JP | 2015-531915 A | 11/2015 |
| JP | 2017-508368 A | 3/2017 |
| WO | WO 1994/010761 A1 | 5/1994 |
| WO | WO 2001/019083 A1 | 3/2001 |
| WO | WO 2005/079172 A2 | 9/2005 |
| WO | WO 2018/078463 A1 | 5/2018 |

OTHER PUBLICATIONS

Zhao et al.; "Synchronous Voice e-Book Development Techniques Based on EPUB+SMIL"; Modern Educational Technology; vol. 22 No. 7; Jul. 2012; 6 pages (English Abstract Only).

* cited by examiner

METHOD AND APPARATUS FOR SYNCHRONIZING AUDIO AND TEXT, READABLE MEDIUM, AND ELECTRONIC DEVICE

CROSS-REFERENCE TO RELATED APPLICATIONS

This application is a U.S. National Stage under 35 U.S.C. § 371 of International Application No. PCT/CN2021/127303, filed on Oct. 29, 2021, which claims the priority to the Chinese patent application No. 202011355859.6 entitled "METHOD AND APPARATUS FOR SYNCHRONIZING AUDIO AND TEXT, READABLE MEDIUM, AND ELECTRONIC DEVICE" and filed on Nov. 26, 2020. The disclosure of each of these applications is incorporated herein by reference in its entirety.

TECHNICAL FIELD

This disclosure relates to the technical field of electronic information, and in particular, to a method and apparatus for synchronizing audio and text, a readable medium, and an electronic device.

BACKGROUND

In the technical field of electronic information, with the increasing popularity of intelligent terminals in daily life, a user can read anytime and anywhere through reading software on the intelligent terminal. However, in many use scenes, needs of the user cannot be met simply by reading, and in a process of the user reading a novel, audio corresponding to the novel can be added for synchronous playing, so that the user can listen while reading to acquire novel information from both dimensions of visual and auditory, which improves reading experience of the user. Since some multimedia content (for example, sponsored content, questionnaires, etc.) is often inserted into the novel, the multimedia content will cause interference to the synchronization between the audio and the novel.

SUMMARY

The "SUMMARY" is provided to introduce concepts in a simplified form, and these concepts will be described in detail below in the following "DETAILED DESCRIPTION OF THE EMBODIMENTS". The "SUMMARY" is not intended to identify key features or essential features of the claimed technical solutions, nor is it intended to limit the scope of the claimed technical solutions.

In a first aspect, the present disclosure provides a method for synchronizing audio and text, comprising:

in response to a first page displayed on a presentation interface being updated to a second page, determining whether the second page comprises multimedia content, wherein audio corresponding to text in the first page is played while the first page is displayed;

if the second page comprises the multimedia content and the multimedia content is in a mute playing state, controlling the audio to be played continuously;

determining a first playing identification of the audio when the playing of the multimedia content is stopped, and determining corresponding target text in accordance with the first playing identification; and updating the second page to a third page on the presentation interface, the third page comprising the target text.

In a second aspect, the present disclosure provides an apparatus for synchronizing audio and text, the apparatus comprising:

a first determination module configured to determine, in response to a first page displayed on a presentation interface being updated to a second page, whether the second page comprises multimedia content, wherein audio corresponding to text in the first page is played while the first page is displayed;

a control module configured to control continuing the audio to be played continuously if the second page comprises the multimedia content and the multimedia content is in a mute playing state;

a second determination module configured to determine a first playing identification of the audio when the playing of the multimedia content is stopped, and determine corresponding target text in accordance with the first playing identification; and an update module configured to update the second page to a third page on the presentation interface, the third page comprising the target text.

In a third aspect, the present disclosure provides a computer-readable medium having thereon stored a computer program which, when executed by a processing device, implements the method in accordance with the first aspect of the present disclosure.

In a fourth aspect, the present disclosure provides an electronic device, comprising:

a storage device having thereon stored a computer program; and a processing device configured to execute the computer program in the storage device to implement the method in accordance with the first aspect of the present disclosure.

Through the above technical solution, in accordance with the present disclosure, in a scene in which the first page displayed on the presentation interface is updated to the second page, it is first determined whether the second page comprises the multimedia content, wherein the audio corresponding to the text in the first page is played while the first page is displayed on the presentation interface. Thereafter, if the second page comprises the multimedia content and the multimedia content is in the mute playing state, the audio is controlled to be continuously played, and then the first playing identification of the audio when the playing of the multimedia content is stopped is determined, so that the corresponding target text is determined in accordance with the first playing identification, and finally the second page is, on the presentation interface, updated to the third page comprising the target text. In accordance with the present disclosure, by identifying that the multimedia content is comprised in the second page presented after page-turning, and controlling the playing of the audio and the content presented on the presentation interface, it is possible to keep the audio and the text synchronous in a case wherein the multimedia content is presented as normal.

Other features and advantages of the present disclosure will be described in detail in the following "DETAILED DESCRIPTION OF THE EMBODIMENTS".

BRIEF DESCRIPTION OF THE DRAWINGS

The above and other features, advantages, and aspects of the embodiments of the present disclosure will become more apparent in combination with the accompanying drawings and with reference to the following "DETAILED DESCRIPTION OF THE EMBODIMENTS". Throughout the drawings, identical or similar reference numbers refer to identical or similar elements. It should be understood that the drawings are schematic and that components and elements are not necessarily drawn to scale. In the drawings.

DETAILED DESCRIPTION OF THE EMBODIMENTS

Figure 1:
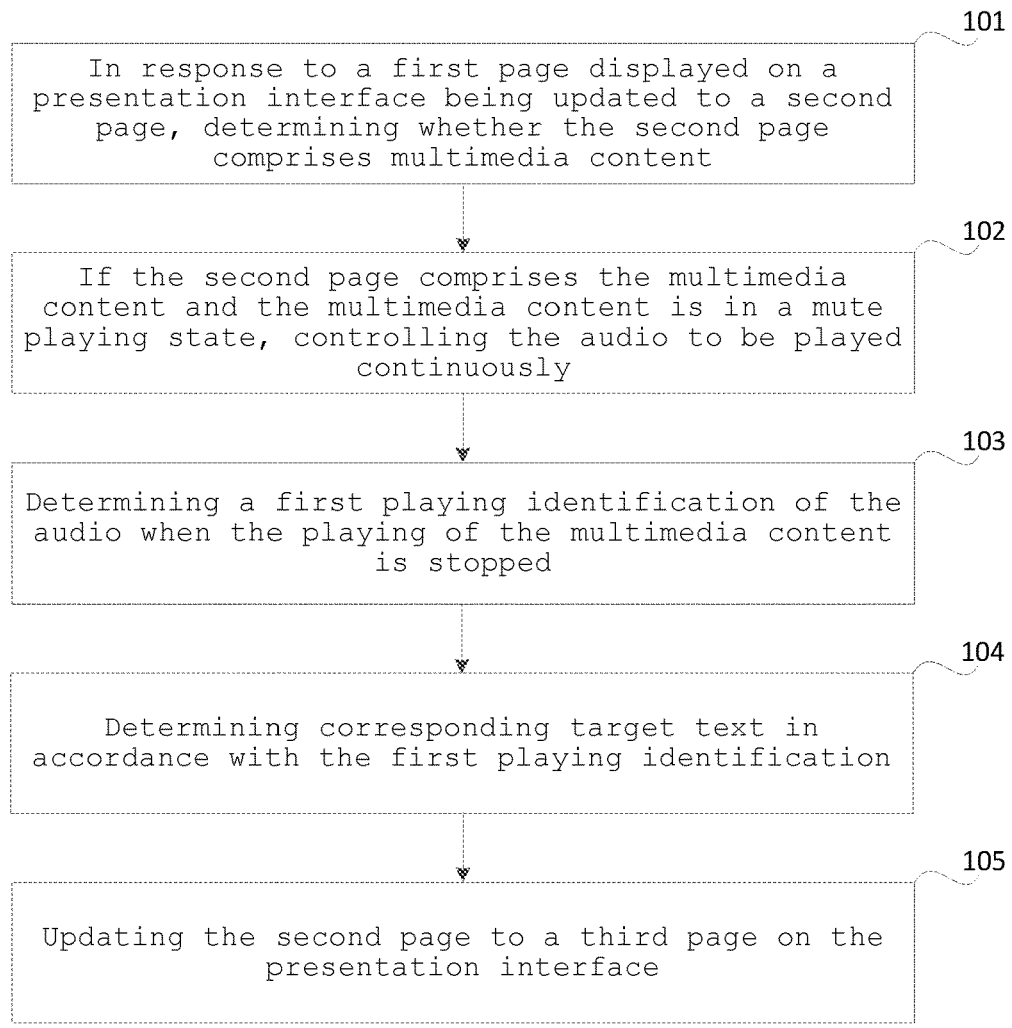
FIG. 1 is a flow diagram illustrating a method for synchronizing audio and text in accordance with an exemplary embodiment.

The embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein, but these embodiments are provided for a more complete and thorough understanding of the present disclosure. It should be understood that the drawings and the embodiments of the present disclosure are for exemplary purposes only and are not intended to limit the scope of the present disclosure.

It should be understood that various steps recited in the method embodiments of the present disclosure can be performed in a different order, and/or performed in parallel. Moreover, the method embodiments can include additional steps and/or omit performing the illustrated steps. The scope of the present disclosure is not limited in this respect.

The term "comprising" and variations thereof used herein is intended to be open-minded, i.e., "comprising but not limited to". The term "based on" is "at least partially based on". The term "one embodiment" means "at least one embodiment"; the term "another embodiment" means "at least one other embodiment"; the term "some embodiments" means "at least some embodiments". Relevant definitions of other terms will be given in the following description.

It should be noted that the concepts of "first", "second", and the like mentioned in the present disclosure are only used for distinguishing different devices, modules or units, and are not used for limiting the order or interdependence of functions performed by the devices, modules or units.

It should be noted that the modification of "one" or "more" mentioned in the present disclosure are intended to be illustrative rather than restrictive, and that those skilled in the art should appreciate that it should be understood as "one or more" unless otherwise clearly indicated in the context.

Names of messages or information interacted between a plurality of devices in the embodiments of the present disclosure are for illustrative purposes only, and are not intended to limit the scope of the messages or information.

FIG. 1 is a flow diagram illustrating a method for synchronizing audio and text in accordance with an exemplary embodiment, and as shown in FIG. 1, the method can comprise the following steps:

step 101, in response to a first page displayed on a presentation interface being updated to a second page, determining whether the second page comprises multimedia content. Audio corresponding to text in the first page is played while the first page is displayed.

For example, a user can read a file through reading software installed on a terminal device, wherein the file can comprise text or multimedia content, and the multimedia content can be, for example, in a format of picture, video, audio, or the like, or a combination of the above. The reading software can present the content in the file on a presentation interface (such as a display screen) of the terminal device, and can also play audio corresponding to the text comprised in the file through a playing device (such as a loudspeaker) of the terminal device at the same time. It can be understood that the reading software includes two parts, namely a reader and a player, wherein the reader is used for controlling the content presented on the presentation interface, and the player is used for controlling the playing device to play the audio. The content presented on the presentation interface at a certain time can be understood as one page, which can comprise text or multimedia content. The file read by the user can be an e-book (such as a novel) or other types of file, such as news, an official-account article, a blog, etc. The file can be in any format, such as .txt, .chm (Compiled HTML Help file), .pdf (Portable Document Format), .epub (Electronic Publication), .mobi, or the like, which is not specifically limited in this disclosure. The text comprised in the file can be, for example, one or more chapters in a novel, or one or more paragraphs, or one or more sentences. Correspondingly, the audio corresponding to the text comprised in the file can be, for example, an audio file obtained by performing conversion on the text through a TTS (Text To Speech) service, or an audio file recorded in accordance with the text. The audio can be a file in any format, such as MP3, .WAV, .WMA (Windows Media Audio), .AMR (Adaptive Multi-Rate), or the like, which is not specifically limited in this disclosure.

When the first page is presented on the presentation interface, the audio corresponding to the text in the first page can also be played, so that the user can listen while reading. If a playing identification of the audio indicates that page-turning is needed, or the user triggers a page-turning instruction, the first page displayed on the presentation interface can be updated to the second page (i.e., a page-turning operation is performed). Content comprised in the second page can be content adjacent to and located after the text comprised in the first page, in the file read by the user, or content inserted by the reading software after the first page. The content comprised in the second page can be text or multimedia content.

Figure 2:
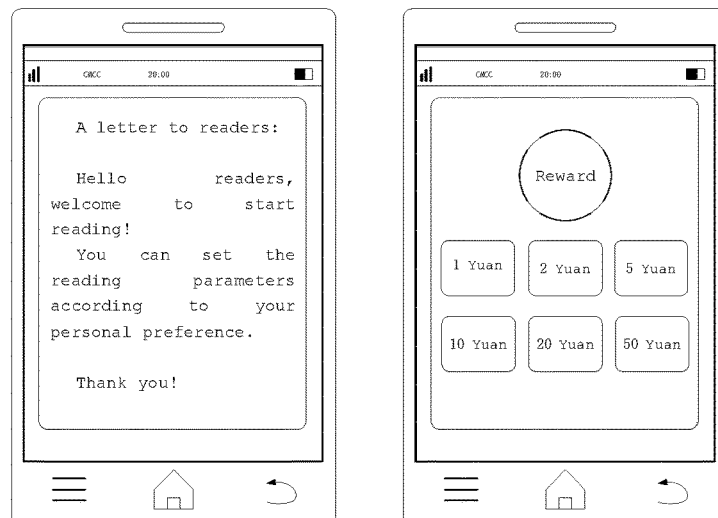
FIG. 2 is a schematic diagram illustrating a presentation interface in accordance with an exemplary embodiment.

The multimedia content can be understood as content that does not belong to what the user expects to read, which can be, for example: sponsored content, questionnaires, reward content, comment content, etc., which will interfere with the synchronization of the audio and the text. Correspondingly, for the page-turning operation (i.e., updating the first page to the second page), it can be judged whether the second page comprises the multimedia content. For example, a first page presented on a presentation interface is shown in (a) of FIG. 2, and when audio corresponding to text in the first page is played to "Thank you!", the first page displayed on the presentation interface is updated to a second page as shown in (b) of FIG. 2, which comprises reward content (i.e., multimedia content).

Step 102, if the second page comprises the multimedia content and the multimedia content is in a mute playing state, controlling the audio to be played continuously.

Exemplarily, if it is judged that the second page does not comprise the multimedia content (i.e., the second page comprises the text), the audio can be controlled to be played continuously, and at this time, the audio keeps synchronized with the text comprised in the second page. If it is judged that the second page comprises the multimedia content, a playing state of the multimedia content can be further judged, and the playing of the audio is controlled in accordance with the playing state of the multimedia content. The playing state can fall into a mute playing state and a non-mute playing state. If the playing state of the multimedia content is the non-mute playing state, the playing of the audio can be controlled to be paused so that the user can hear sound in the multimedia content, and the playing of the audio can be resumed after the playing of the multimedia content is completed. If the playing state of the multimedia content is the mute playing state, the audio can be controlled to be played continuously, and in this way, the user acquiring the information through the audio is not affected. The playing state of the multimedia content being the mute playing state can fall into two scenes, wherein in Scene 1, the multimedia content itself does not comprise sound (for example, the multimedia content is comment content), and in Scene 2, the multimedia content comprises sound but in accordance with the settings in the reading software, the sound comprised in the multimedia content is not played.

Step 103, determining a first playing identification of the audio when the playing of the multimedia content is stopped.

Step 104, determining corresponding target text in accordance with the first playing identification.

Exemplarily, in the process of the playing of the multimedia content, the playing of the audio is continued, and at this time, the text corresponding to the audio is not presented on the presentation interface, thus the audio and the text are not synchronized. Therefore, when the playing of the multimedia content is stopped, the first playing identification of the audio at this time can be acquired to determine the corresponding target text. The first playing identification can be understood as one or more audio frames to which the audio is played at this time, can also be understood as a playing progress of the audio at this time, and can further be understood as which audio file in a plurality of audio files is played. The playing of the multimedia content being stopped can be understood as the playing of the multimedia content being completed, or the multimedia content being presented for a preset duration (for example, 30 s), or the multimedia content being closed by the user performing a preset operation.

Thereafter, the target text corresponding to the first playing identification can be determined in accordance with the first playing identification and a pre-established mapping relation between a playing identification of the audio and the text. Specifically, the mapping relation between the playing identification of the audio and the text can be pre-established, wherein the mapping relation has therein stored a plurality of mapping records, each of which comprises a correspondence between the text and the playing identification. Then a mapping record matched with the first playing identification is found in the mapping relation, thereby determining the target text in accordance with the mapping record. The target text can be understood as text matched with the first playing identification in the file read by the user, that is, sound content comprised in an audio frame which is indicated by the first playing identification to which the audio is played corresponds to verbal content comprised in the target text.

Step 105, updating the second page to a third page on the presentation interface, the third page comprising the target text.

Exemplarily, after the target text is determined, the second page displayed on the presentation interface can be updated to the third page comprising the target text, and since the audio is continuously played in the above process, when the audio is played to the audio frame indicated by the first playing identification, the target text corresponding to the first playing identification is displayed on the presentation interface, so that the audio and the target text are kept synchronous. In this way, after the user browses the multimedia content, the audio can still keep synchronized with the third page displayed on the presentation interface, so that the user can continue listening while reading, which improves reading experience of the user.

In summary, in accordance with the present disclosure, in a scene in which the first page displayed on the presentation interface is updated to the second page, it is first determined whether the second page comprises the multimedia content, wherein the audio corresponding to the text in the first page is played while the first page is displayed on the presentation interface. Thereafter, if the second page comprises the multimedia content and the multimedia content is in the mute playing state, the audio is controlled to be played continuously, and then the first playing identification of the audio when the playing of the multimedia content is stopped is determined, so that the corresponding target text is determined in accordance with the first playing identification, and finally the second page is, on the presentation interface, updated to the third page comprising the target text. In accordance with the present disclosure, by identifying that the multimedia content is comprised in the second page presented after page-turning, and controlling the playing of the audio and the content presented on the presentation interface, it is possible to keep the audio and the text synchronous in a case wherein the multimedia content is presented as normal.

Figure 3:
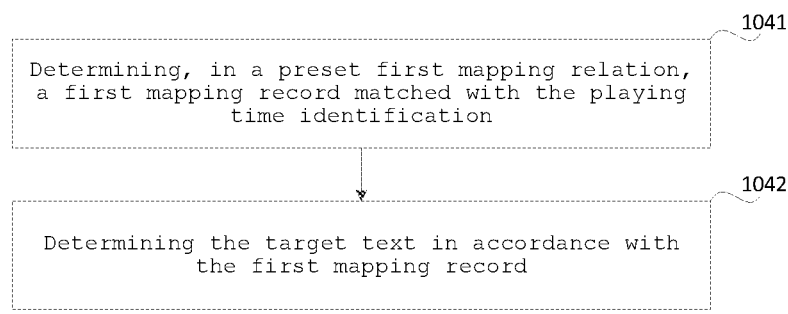
FIG. 3 is a flow diagram illustrating another method for synchronizing audio and text in accordance with an exemplary embodiment.

FIG. 3 is a flow diagram illustrating another method for synchronizing audio and text in accordance with an exemplary embodiment, and as shown in FIG. 3, the first playing identification comprises a playing time identification, so that the step 104 can comprise:

step 1041, determining, in a preset first mapping relation, a first mapping record matched with the playing time identification. The first mapping relation comprises at least one mapping record which comprises a correspondence between the text and a playing time range of the audio, and the playing time identification falls within the playing time range in the first mapping record.

Step 1042, determining the target text in accordance with the first mapping record.

In one scene, the first playing identification can comprise the playing time identification, which is used for indicating that the audio is played to which audio frame or to which moment. Correspondingly, in order to determine the target text corresponding to the first playing identification, the first mapping relation between the playing time range of the audio and the text can be acquired first, wherein the first mapping relation has therein stored a plurality of mapping records, each comprising the correspondence between the text and the playing time range of the audio.

The text can be one or more sentences, or one or more paragraphs, or one or more chapters in the file read by the user. The text can be represented, for example, by a sentence identification, or a paragraph identification, or a chapter identification. Correspondingly, the playing time range is used for indicating start and end times of the audio corresponding to the corresponding text, and can be, for example, a frame number range or a time range. For example, if a playing time range comprised in one mapping record is 5 s to 20 s and a sentence identification of corresponding text is 0x57AD, the mapping record indicates that when audio is played to the 5th second to the 20th second, the corresponding text is text with the sentence identification of 0x57AD. Or, if a playing time range comprised in another mapping record is 35th frame to 80th frame and a paragraph identification of corresponding text is 0106, the mapping record indicates that when audio is played to the 35th frame to the 80th frame, the corresponding text is text with the paragraph identification of 0106. Thereafter, the first mapping record is searched for in the first mapping relation, and the playing time identification falls within the playing time range in the first mapping record. Accordingly, the text in the first mapping record is taken as the target text.

It should be noted that the first mapping relation can be pre-established and stored in a server, and when the terminal device plays the audio, the first mapping relation can be acquired from the server. The first mapping relation can be obtained when the audio is obtained by performing text conversion with use of the TTS service, or can be obtained in accordance with a correspondence between sound content comprised in each audio frame in the audio and verbal content in the text.

Figure 4:
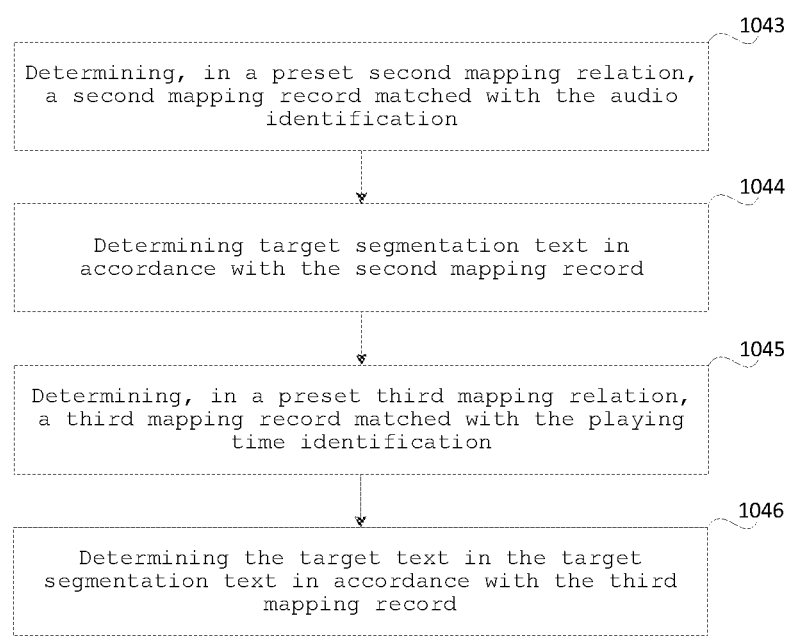
FIG. 4 is a flow diagram illustrating another method for synchronizing audio and text in accordance with an exemplary embodiment.

FIG. 4 is a flow diagram illustrating another method for synchronizing audio and text in accordance with an exemplary embodiment, and as shown in FIG. 4, the audio comprises at least one audio file, the first playing identification comprises a playing time identification and an audio identification, and correspondingly, the step 104 may comprise:

step 1043, determining, in a preset second mapping relation, a second mapping record matched with the audio identification, wherein the second mapping relation comprises at least one mapping record which comprises a correspondence between the audio file and segmentation text, and a target audio file indicated by the audio identification is the audio file in the second mapping record.

Step 1044, determining target segmentation text in accordance with the second mapping record.

In another scene, the audio can comprise at least one audio file, and correspondingly, the first playing identification can comprise the playing time identification and the audio identification, wherein the playing time identification is used for indicating that the audio is played to which audio frame, or to which moment. The audio identification is used for indicating that which audio file in the at least one audio file is currently played.

In order to determine the target text corresponding to the first playing identification, a second mapping relation between the audio file and the segmentation text can be acquired first, wherein the second mapping relation has therein stored a plurality of mapping records, each comprising a correspondence between the segmentation text and the audio file. The segmentation text can be understood as one or more chapters (correspondingly, text can be understood as a paragraph or sentence in the chapter) in the file read by the user, or can be understood as one or more paragraphs (correspondingly, text can be understood as a sentence in the chapter). The segmentation text can be represented by a chapter identification or a paragraph identification. For example, if an audio identification of an audio file comprised in one mapping record is al and a chapter identification of corresponding segmentation text is 0x1005, the mapping record indicates that when the audio file al is played, the corresponding segmentation text is segmentation text with the chapter identification of 0x1005. For another example, if an audio identification of an audio file comprised in one mapping record is b1 and a paragraph identification of a corresponding segmentation text is 0xAA00, the mapping record indicates that when the audio file b1 is played, the corresponding segmentation text is segmentation text with the paragraph identification of 0xAA00. Thereafter, the second mapping record, the audio file in which is the same as the target audio file indicated by the audio identification comprised in the first playing identification, can be searched for in the second mapping relation. Accordingly, the segmentation text in the second mapping record is taken as the target segmentation text.

Step 1045, determining, in a preset third mapping relation, a third mapping record matched with the playing time identification, wherein the third mapping relation comprises at least one mapping record which comprises a correspondence between text in the target segmentation text and a playing time range of the target audio file, and the playing time identification falls within the playing time range in the third mapping record.

Step 1046, determining the target text in the target segmentation text in accordance with the third mapping record.

Exemplarily, after the target segmentation text is determined, the third mapping relation between text in the target segmentation text and the playing time range of the target audio file can be acquired, wherein the third mapping relation has therein stored a plurality of mapping records, each of which comprises a correspondence between the text in the target segmentation text and the playing time range of the target audio file.

If the target segmentation text is one chapter in the file read by the user, the text can be one paragraph in the target segmentation text, and if the target segmentation text is one paragraph in the file read by the user, the text can be one sentence in the target segmentation text. Correspondingly, the playing time range is used for indicating start and end times of the audio corresponding to the corresponding text, which can be, for example, a frame number range or a time range. For example, if the playing time range of the target audio file comprised in one mapping record is 100th second to a 250th second and a sentence identification of corresponding text in target segmentation text is 0x281D, the mapping record indicates that when audio is played to a 100th second to a 250th second of the target audio file, the corresponding text is text with the sentence identification of 0x281D of the target segmentation text. Thereafter, the third mapping record is searched for in the third mapping relation, and the playing time identification comprised in the first playing identification falls within the playing time range in the third mapping record. Accordingly, the text in the third mapping record is taken as the target text.

It should be noted that both the second mapping relation and the third mapping relation can be pre-established and stored in the server, and when the terminal device plays the audio, the second mapping relation and the third mapping relation can be acquired from the server. The second mapping relation and the third mapping relation can be obtained when the audio is obtained by performing text conversion with use of the TTS service, or can be obtained in accordance with a correspondence between sound content comprised in each audio frame in the audio and verbal content in the text.

Figure 5:
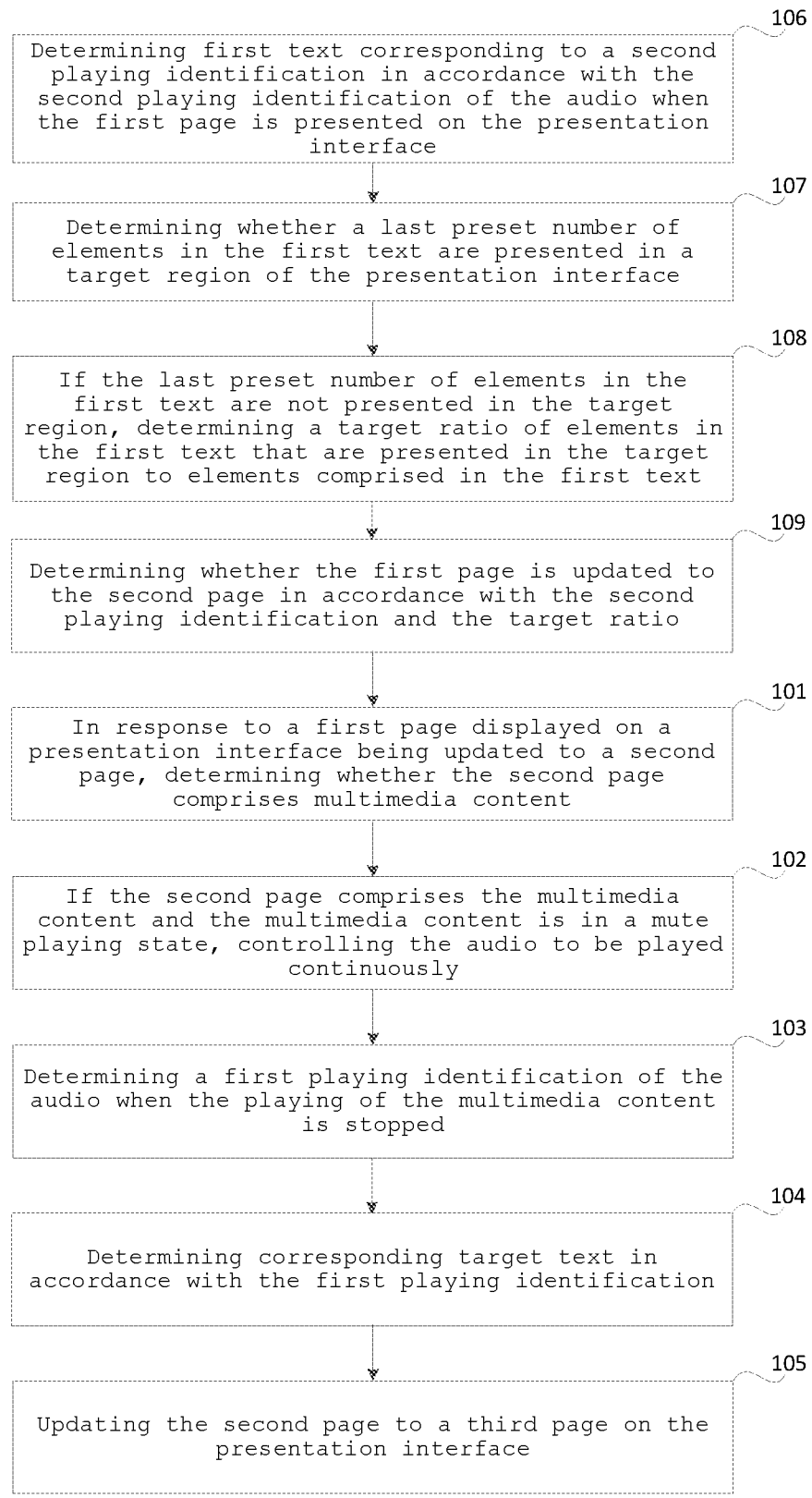
FIG. 5 is a flow diagram illustrating another method for synchronizing audio and text in accordance with an exemplary embodiment.

FIG. 5 is a flow diagram illustrating another method for synchronizing audio and text in accordance with an exemplary embodiment, and as shown in FIG. 5, the method can further comprise:

step 106, determining first text corresponding to a second playing identification in accordance with the second playing identification of the audio when the first page is presented on the presentation interface.

step 107, determining whether a last preset number of elements in the first text are presented in a target region of the presentation interface.

For example, when a first page is presented on a presentation interface, audio corresponding to text in the first page is played at the same time, so that a user can listen while reading. First text corresponding to a second playing identification can be determined in accordance with the current second playing identification of the audio. A manner of determining the first text is the same as that of determining the target text shown in FIGS. 3 and 4, which is not repeated herein. Thereafter, it can be determined whether the first text is completely presented in the target region of the presentation interface. When the text is presented on the presentation interface, a phenomenon of page-across often occurs, that is to say, the text cannot be completely presented in the target region of the presentation interface at one time, and in this way, for the corresponding text that is determined in accordance with the second playing identification of the audio, it is difficult to perform page-turning accurately, resulting in a difficulty in keeping the audio and the text synchronous. Therefore, it is necessary to determine whether the first text is completely displayed in the target region of the presentation interface at the current time. The first text can comprise one or more elements, wherein the element can be understood as a minimum unit that constitutes the first text, and if the first text is a sentence or paragraph, the element can be one character (or one word). The target region can be, for example, an area where the last text is located in the presentation interface, or can be a pre-designated area (for example, a middle area, an upper area, a lower area, or the like of the presentation interface).

The first text being completely presented in the target region indicates that at the current time, all elements constituting the first text are presented in the target region. The first text being not completely presented in the target region can fall into three scenes: Scene 1, in which a first preset number of elements in the first text are not presented in the target region; Scene 2, in which a last preset number of elements in the first text are not presented in the target region; and Scene 3, in which both the first preset number of elements in the first text and the last preset number of elements in the first text are not presented in the target region. The preset number can be, for example, 1 or 2, or another numerical value, which is not specifically limited in the present disclosure. In order to enable the audio and the text to keep synchronous, it is necessary to determine a suitable time to perform the page-turning operation in the Scenes 2 and 3. Therefore, it can be judged whether the last preset number of elements in the first text are presented in the target region.

Step 108, if the last preset number of elements in the first text are not presented in the target region, determining a target ratio of elements in the first text that are presented in the target region to elements comprised in the first text.

Step 109, determining whether the first page is updated to the second page in accordance with the second playing identification and the target ratio.

Exemplarily, if the last preset number of elements in the first text are not presented in the target region, it is indicated that the first text is not completely presented in the target region, and at this time, a ratio of the elements in the first text that are presented in the target region to the elements comprised in the first text, i.e., the target ratio, can be determined. The target ratio can be understood as a ratio of the number of the elements presented in the target region to a total number of all the elements constituting the first text, can also be understood as a ratio of an area occupied by the elements presented in the target region to a total area of all the elements of the first text, and can further be understood as a ratio of the number of bytes of the elements presented in the target region to a total number of bytes of all the elements of the first text. For example, the first text is a sentence "这是一篇样例文本" ("This is one sample text"), and in the first text, only "这是一篇样" is presented in the target region, that is, the last three elements "例文本" of the first text are not presented in the target region. At this time, the target ratio of the number of elements in the first text that are presented in the target region to the total number of all elements in the first text is 5/8. Finally, it can be determined whether the first page is updated to the second page in accordance with the second playing identification and the target ratio.

Specifically, it can be considered that speeds at which the sound in the audio that corresponds to each element is played are the same, and hence it can be determined that the audio is played to which element of the first text in accordance with the second playing identification, and, if the element to which the audio is played and which is determined in accordance with the second playing identification corresponds to the last element of the first text that is presented in the target region, the first page can be updated to the second page, and if the element to which the audio is played and which is determined in accordance with the second playing identification does not correspond to the last element of the first text that is presented in the target region, the first page may not be updated to the second page, and the playing of the audio is continued.

Figure 6:
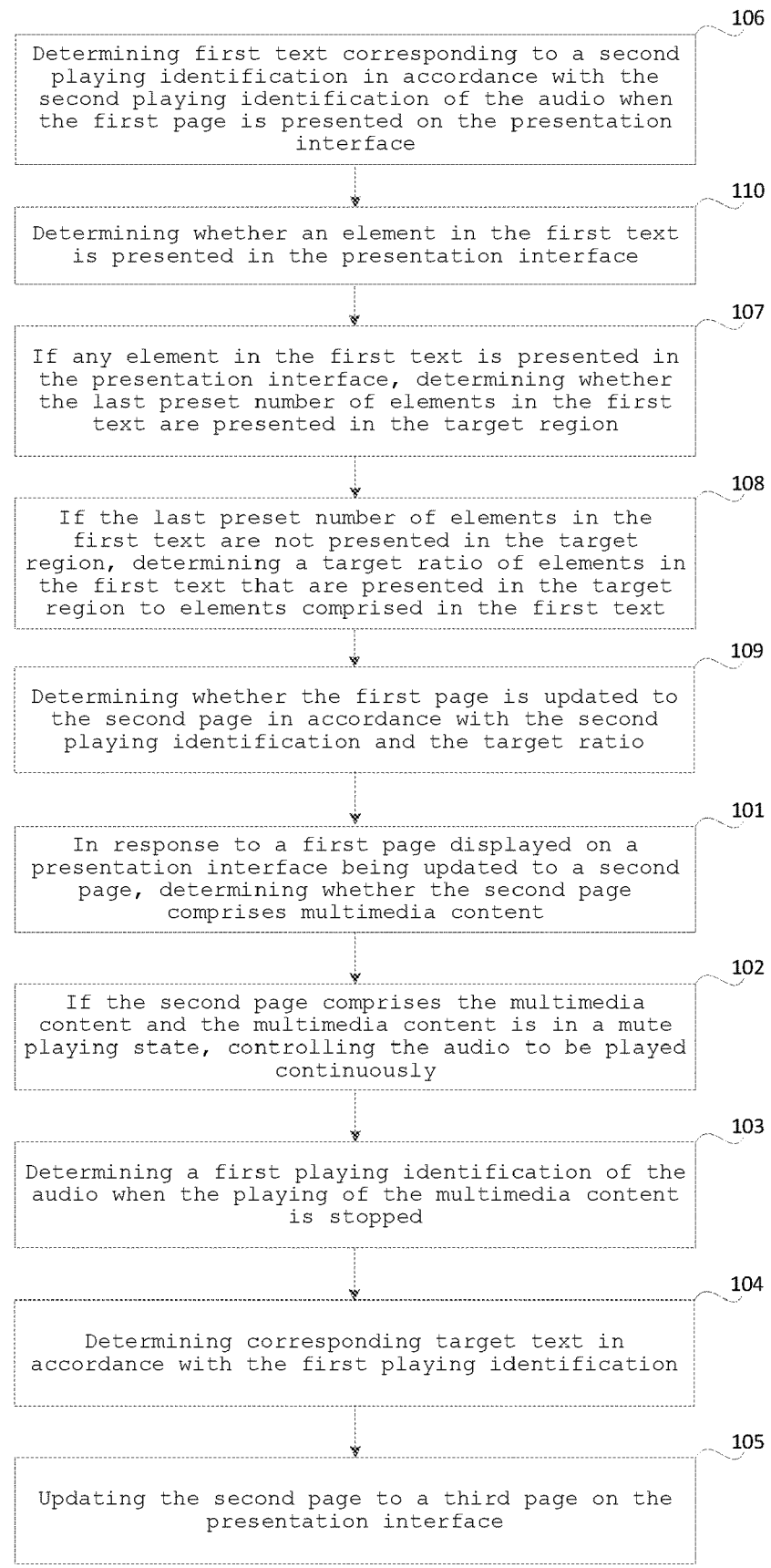
FIG. 6 is a flow diagram illustrating another method for synchronizing audio and text in accordance with an exemplary embodiment.

FIG. 6 is a flow diagram illustrating another method for synchronizing audio and text in accordance with an exemplary embodiment, and as shown in FIG. 6, the method can further comprise:

step 110, determining whether an element in the first text is presented in the presentation interface.

Correspondingly, the step 107 can be:

if any element in the first text is presented in the presentation interface, determining whether the last preset number of elements in the first text are presented in the target region.

In one implementation scene, after the first text is determined, it can further be judged whether the first text is comprised in the first page. That is to say, it is judged whether the first page and the audio are synchronized. The user possibly manually performs page-turning while reading, resulting in that the audio and the page presented on the presentation interface are not synchronized. For example, a current playing identification of audio corresponds to text with a sentence identification of 0x330, so that a first page comprises the text with the sentence identification of 0x330, and thereafter, if a user manually performs forward page-turning twice, the text with the sentence identification of 0x330 will not be comprised in a page presented on a presentation interface, so that the page presented on the presentation interface and the audio are no longer synchronized.

Specifically, it can be determined first whether any element in the first text is presented in the presentation interface. If none of the elements in the first text is presented in the presentation interface, it is indicated that the audio and the text are not synchronized at this time, so that at this time, the audio can be controlled to be played continuously and the original page can be presented continuously on the presentation interface (i.e. no page-turning operation is performed). If there are one or more elements in the first text that are presented in the presentation interface, it is indicated that the audio is synchronized with the text at this time, so that it can be further determined whether the last preset number of elements in the first text are displayed in the target region.

Figure 7:
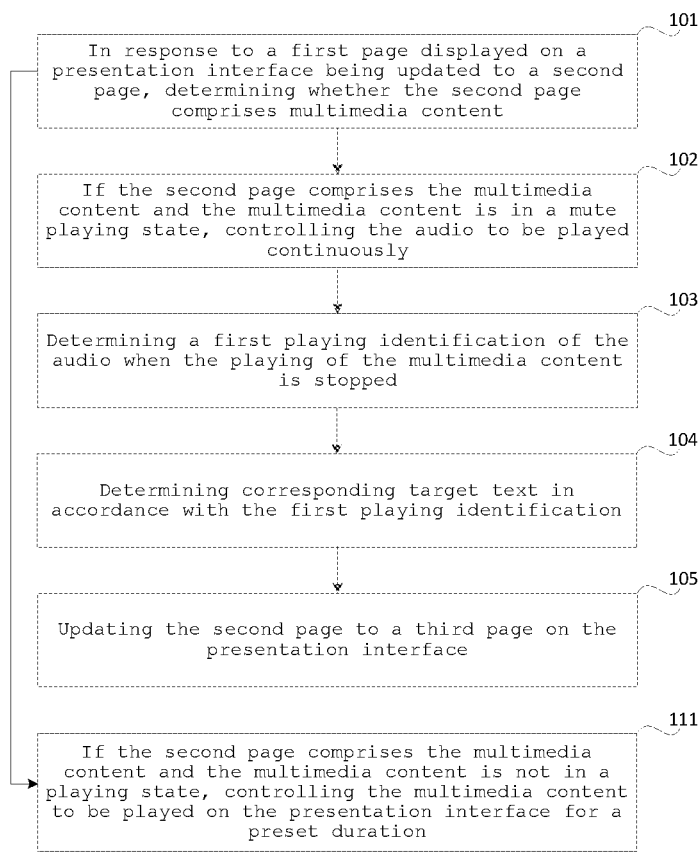
FIG. 7 is a flow diagram illustrating another method for synchronizing audio and text in accordance with an exemplary embodiment.

FIG. 7 is a flow diagram illustrating another method for synchronizing audio and text in accordance with an exemplary embodiment, and as shown in FIG. 7, the method can further comprise:

step 111, if the second page comprises the multimedia content and the multimedia content is not in a playing state, controlling the multimedia content to be played on the presentation interface for a preset duration.

In one application scene, if the second page comprises the multimedia content and the multimedia content is not in the playing state, the multimedia content can be controlled to be played on the presentation interface for the preset duration (which can be, for example, 3s). After the preset duration, the playing of the multimedia content can be stopped.

In another application scene, if the second page comprises the multimedia content and the multimedia content is not in the playing state, it can be determined whether a trigger instruction for the multimedia content is received. The trigger instruction can be understood as an instruction issued by the user clicking the multimedia content after viewing the multimedia content. For example, if multimedia content is sponsored content, and a user is interested in the sponsored content and wants to know the sponsored content further, the user can click the sponsored content. After a trigger instruction is received, a corresponding multimedia file can be acquired in accordance with a jump link comprised in the multimedia content, and the multimedia file is controlled to be presented for a preset duration on a presentation interface. The multimedia file can be a text file, a picture file, a video file, an audio file, or the like, or a combination of the above. The jump link can be understood as an address from which the multimedia file can be acquired, which can be, for example, a URL (Uniform Resource Locator) address.

Figure 8:
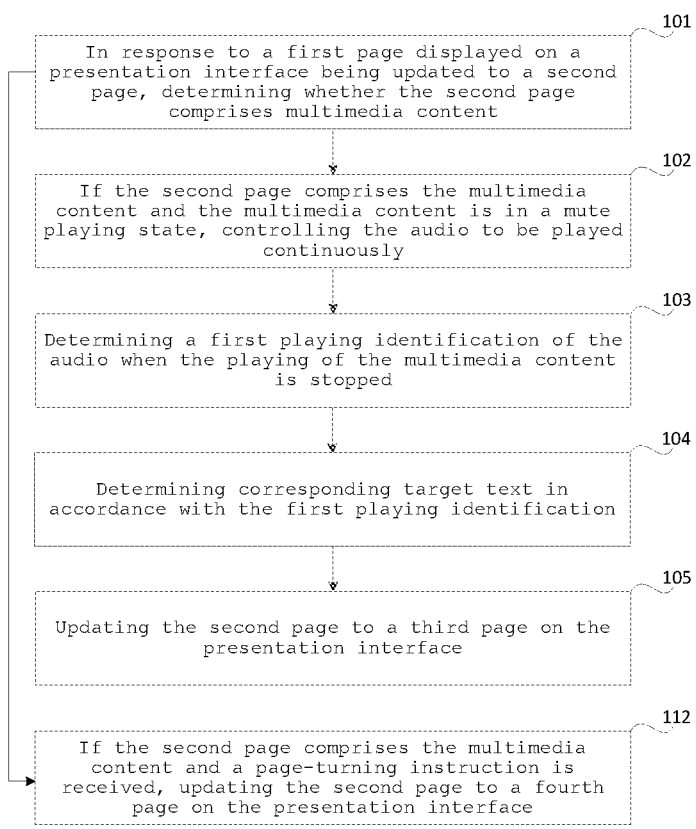
FIG. 8 is a flow diagram illustrating another method for synchronizing audio and text in accordance with an exemplary embodiment.

FIG. 8 is a flow diagram illustrating another method for synchronizing audio and text in accordance with an exemplary embodiment, and as shown in FIG. 8, the method can further comprise:

step 112, if the second page comprises the multimedia content and the page-turning instruction is received, updating the second page to a fourth page on the presentation interface, the fourth page comprising second text indicated by the page-turning instruction.

In yet another application scene, if the second page comprises the multimedia content and the page-turning instruction is received, the playing of the multimedia content on the presentation interface can be stopped, and the second page can be updated to the fourth page that comprises the second text indicated by the page-turning instruction. For example, if multimedia content comprised in a second page is comment content, and a user is not interested in the comment content and clicks a "page-turning" button on the presentation interface to issue a page-turning instruction, the playing of the comment content can be stopped, and the second page is updated to the fourth page. The second text can be, for example, text that is adjacent to and located after text comprised on the first page, in the file read by the user.

Further, it can also be determined whether a response is made to the page-turning instruction in accordance with a presentation attribute of the multimedia content. The presentation attribute is used for indicating whether the multimedia content shall be presented in a mandatory way. For example, if a presentation attribute of multimedia content is a mandatory presentation, given that a user clicks the "page-turning" button on a presentation interface to send a page-turning instruction within a preset mandatory presentation duration (for example, 5 s), a terminal device will not make a response to the page-turning instruction, that is, a second page is not updated to a fourth page. If the presentation attribute of the multimedia content is not a mandatory presentation, given that the user clicks the "page-turning" button on the presentation interface to send the page-turning instruction, the terminal device makes a response to the page-turning instruction, that is, the second page is updated to the fourth page.

It should be noted that the page-turning operation (i.e. updating the first page to the second page, updating the second page to the third page, updating the second page to the fourth page, etc.) in the above embodiment can comprise: a horizontal page-turning operation, or a scrolling page-turning operation.

Correspondingly, if the page-turning operation is the horizontal page-turning operation, an implementation of the step 105 can be:

replacing the second page with the third page on the presentation interface in accordance with a preset page-turning effect, the preset page-turning effect comprising: any of page-turning animation, overlay animation, and translation animation.

If the page-turning operation is the scrolling page-turning operation, the implementation of the step 105 can be:

scrolling from the second page to the third page on the presentation interface in accordance with a preset speed.

Exemplarily, if the page-turning operation is the horizontal page-turning operation, performing the page-turning operation each time can be understood as switching the current content to the next page to be presented on the presentation interface, and in the process of the switching, various preset page-turning effects can be added, for example: page-turning animation, overlay animation, translation animation, etc. The page-turning animation can be understood as animation capable of presenting an actual page-turning effect of paper, the overlay animation can be understood as animation capable of presenting an effect that one piece of paper overlays another piece of paper, and the translation animation can be understood as animation capable of presenting an effect that one piece of paper is removed from another piece of paper. The preset page-turning effect can also be other animations, which is not specifically limited in the present disclosure. Correspondingly, in the step 105, the second page can be replaced with the third page on the presentation interface in accordance with the preset page-turning effect, that is, the preset page-turning effect can be added in the process of switching the second page to the third page.

If the page-turning operation is the scrolling page-turning operation, performing the page-turning operation each time can be understood as gradually scrolling the current content to the next page to be presented on the presentation interface, and in the process of the scrolling, the current content can be scrolled downwards for a certain duration (for example, 5 s) in accordance with a preset speed (for example, 3 lines/second), or can be scrolled downwards to a specified position in accordance with the preset speed. Correspondingly, in the step 105, the second page can be scrolled to the third page on the presentation interface in accordance with the preset speed, that is, the scrolling page-turning operation can be performed in accordance with the preset speed until the third page can be completely presented on the presentation interface.

In the above embodiment, an implementation of the playing audio corresponding to text in the first page while the first page is displayed can comprise:

step 1) determining third text corresponding to a third playing identification in accordance with the third playing identification of the audio when the first page is presented on the presentation interface;

step 2) marking the third text on the presentation interface in accordance with a preset display mode, the preset display mode comprising: at least one of highlight display, underline display, or bold display.

Figure 9:
FIG. 9 is a schematic diagram illustrating a presentation interface in accordance with an exemplary embodiment.

For example, when a first page is presented on a presentation interface, audio corresponding to text in the first page is played at the same time, so that the user can listen while reading. Third text corresponding to a third playing identification can be determined in accordance with the current third playing identification of the audio. A manner of determining the third text is the same as that of determining the target text shown in FIGS. 3 and 4, which is not repeated herein. In order to enable a user to intuitively check that the third playing identification corresponds to the third text, the third text can be marked in accordance with a preset display mode. The preset display mode comprises: at least one of highlight display, underline display, or bold display. For example, in a first page presented on a presentation interface, the third text is "这是一篇样例文本", and the third text can be marked in accordance with highlight display, which has an effect as shown in FIG. 9.

In summary, in accordance with the present disclosure, in a scene in which the first page displayed on the presentation interface is updated to the second page, it is first determined whether the second page comprises the multimedia content, wherein the audio corresponding to the text in the first page is played while the first page is displayed on the presentation interface. Thereafter, if the second page comprises the multimedia content and the multimedia content is in the mute playing state, the audio is controlled to be played continuously, and then the first playing identification of the audio when the playing of the multimedia content is stopped is determined, so that the corresponding target text is determined in accordance with the first playing identification, and finally the second page is, on the presentation interface, updated to the third page comprising the target text. In accordance with the present disclosure, by identifying that the multimedia content is comprised in the second page presented after page-turning, and controlling the playing of the audio and the content presented on the presentation interface, it is possible to keep the audio and the text synchronous in a case wherein the multimedia content is presented as normal.

Figure 10:
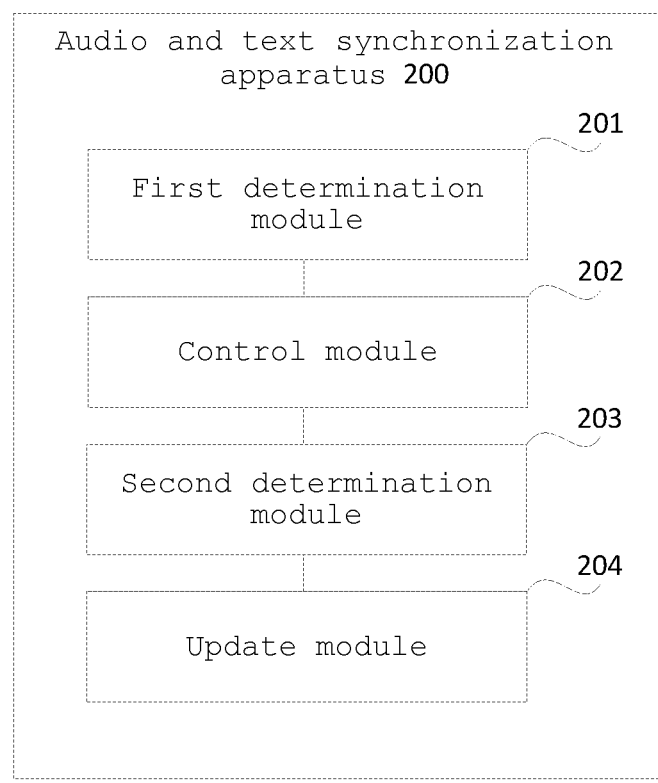
FIG. 10 is a block diagram illustrating an apparatus for synchronizing audio and text in accordance with an exemplary embodiment.

FIG. 10 is a block diagram illustrating an apparatus for synchronizing audio and text in accordance with an exemplary embodiment, and as shown in FIG. 10, the apparatus 200 comprises:

a first determination module 201 configured to determine, in response to a first page displayed on a presentation interface being updated to a second page, whether the second page comprises multimedia content, wherein audio corresponding to text in the first page is played while the first page is displayed;

a control module 202 configured to control, if the second page comprises the multimedia content and the multimedia content is in a mute playing state, the audio to be played continuously;

a second determination module 203 configured to determine a first playing identification of the audio when the playing of the multimedia content is stopped, and determine corresponding target text in accordance with the first playing identification; and an update module 204 configured to update the second page to a third page on the presentation interface, the third page comprising the target text.

In one application scene, the first playing identification comprises a playing time identification, and the second determination module 203 can be used for performing the following steps:

step 1) determining, in a preset first mapping relation, a first mapping record matched with the playing time identification, wherein the first mapping relation comprises at least one mapping record which comprises a correspondence between the text and an playing time range of the audio, and the playing time identification falls within the playing time range in the first mapping record.

Step 2) determining the target text in accordance with the first mapping record.

In another application scene, the audio comprises at least one audio file, the first playing identification comprises a playing time identification and an audio identification, so that the second determination module 203 can be used for performing the following steps:

Step 3) determining, in a preset second mapping relation, a second mapping record matched with the audio identification, wherein the second mapping relation comprises at least one mapping record which comprises a correspondence between the audio file and segmentation text, and a target audio file indicated by the audio identification is the audio file in the second mapping record.

Step 4) determining a target chapter in accordance with the second mapping record.

Step 5) determining, in a preset third mapping relation, a third mapping record matched with the playing time identification, wherein the third mapping relation comprises at least one mapping record which comprises a correspondence between text in the target segmentation text and a playing time range of the target audio file, and the playing time identification falls within the playing time range in the third mapping record.

Step 6) determining the target text in the segmentation text in accordance with the third mapping record.

Figure 11:
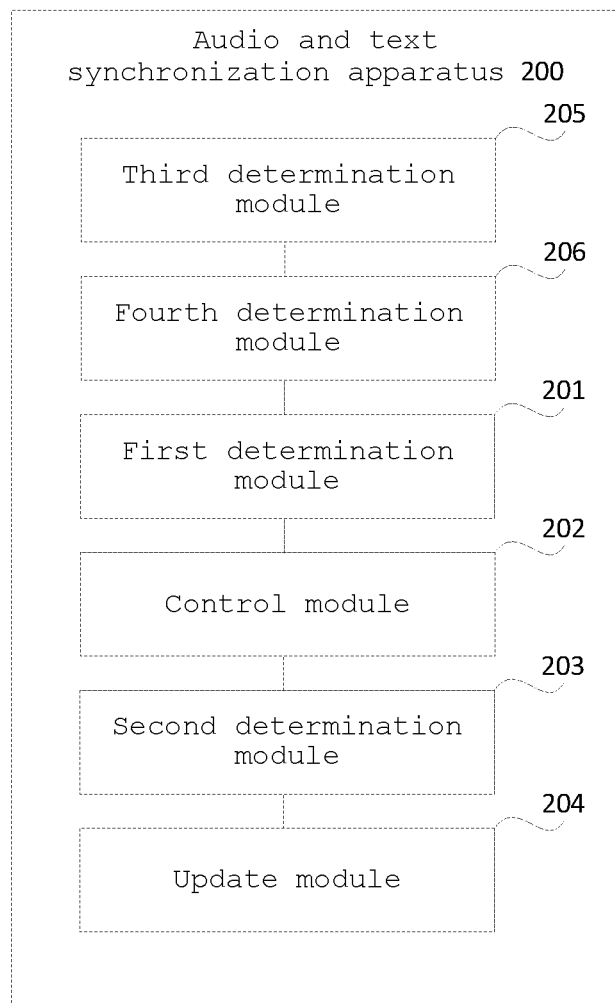
FIG. 11 is a block diagram illustrating another apparatus for synchronizing audio and text in accordance with an exemplary embodiment.

FIG. 11 is a block diagram illustrating another apparatus for synchronizing audio and text in accordance with an exemplary embodiment, and as shown in FIG. 11, the apparatus 200 further comprises:

a third determination module 205 configured to determine first text corresponding to a second playing identification in accordance with the second playing identification of the audio when the first page is presented on the presentation interface, and determine whether a last preset number of elements in the first text are presented in a target region of the presentation interface; and a fourth determination module 206 configured to determine, if the last preset number of elements in the first text are not presented in the target region, a target ratio of elements in the first text that are presented in the target region to elements comprised in the first text, and determine whether the first page is updated to the second page in accordance with the second playing identification and the target ratio.

In one application scene, the third determination module 205 is configured to:

determine whether an element in the first text is presented in the presentation interface, and if any element in the first text is presented in the presentation interface, determining whether the last preset number of elements in the first text are presented in the target region.

In another application scene, the control module 202 can be further configured to:

if the second page comprises the multimedia content and the multimedia content is not in a playing state, control the multimedia content to be played on the presentation interface for a preset duration.

In yet another application scene, the control module 202 can further be configured to:

if the second page comprises the multimedia content and a page-turning instruction is received, update the second page to a fourth page on the presentation interface, the fourth page comprising second text indicated by the page-turning instruction.

Figure 12:
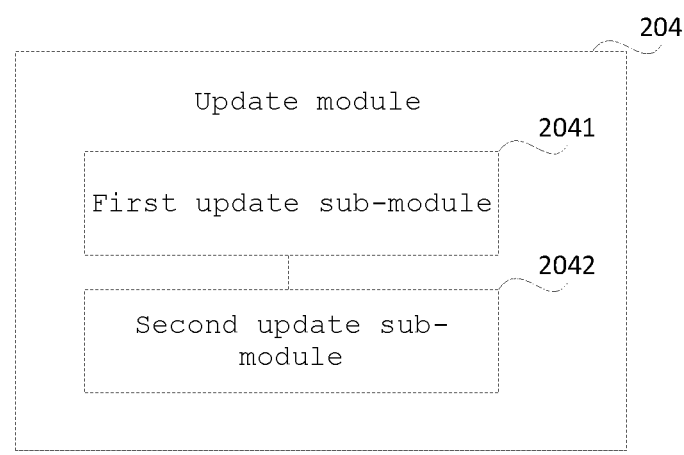
FIG. 12 is a block diagram illustrating another apparatus for synchronizing audio and text in accordance with an exemplary embodiment.

FIG. 12 is a block diagram illustrating another apparatus for synchronizing audio and text in accordance with an exemplary embodiment, and as shown in FIG. 12, the update module 204 can comprise:

a first update sub-module 2041 configured to replace the second page with the third page on the presentation interface in accordance with a preset page-turning effect, the preset page-turning effect comprising: any of page-turning animation, overlay animation, and translation animation; and a second update sub-module 2042 configured to scroll from the second page to the third page on the presentation interface in accordance with a preset speed.

Figure 13:
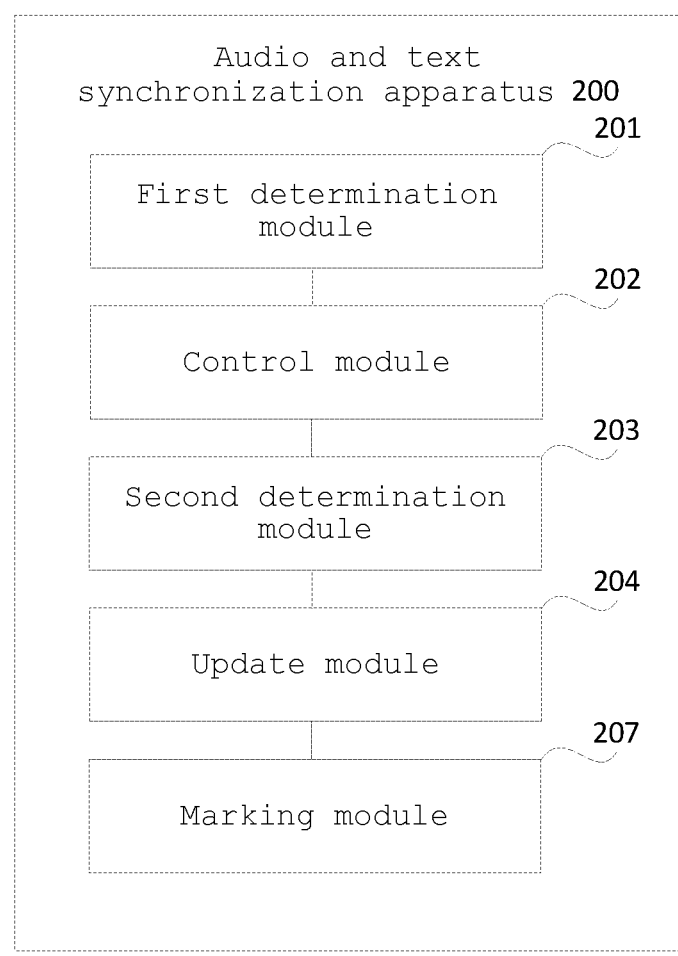
FIG. 13 is a block diagram illustrating another apparatus for synchronizing audio and text in accordance with an exemplary embodiment.

FIG. 13 is a block diagram illustrating another apparatus for synchronizing audio and text in accordance with an exemplary embodiment, and as shown in FIG. 13, the apparatus 200 can further comprise:

a marking module 207 configured to determine third text corresponding to a third playing identification in accordance with the third playing identification of the audio when the first page is presented on the presentation interface, and mark the third text on the presentation interface in accordance with a preset display mode, the preset display mode comprising: at least one of highlight display, underline display, or bold display.

With regard to the apparatus in the above embodiment, a specific manner in which each module performs the operation has been described in detail in the embodiment related to the method, which will not be described in detail here.

In summary, in accordance with the present disclosure, in a scene in which the first page displayed on the presentation interface is updated to the second page, it is first determined whether the second page comprises the multimedia content, wherein the audio corresponding to the text in the first page is played while the first page is displayed on the presentation interface. Thereafter, if the second page comprises the multimedia content and the multimedia content is in the mute playing state, the audio is controlled to be played continuously, and then the first playing identification of the audio when the playing of the multimedia content is stopped is determined, so that the corresponding target text is determined in accordance with the first playing identification, and finally the second page is, on the presentation interface, updated to the third page comprising the target text. In accordance with the present disclosure, by identifying that the multimedia content is comprised in the second page presented after page-turning, and controlling the playing of the audio and the content presented on the presentation interface, it is possible to keep the audio and the text synchronous in a case wherein the multimedia content is presented as normal.

Figure 14:
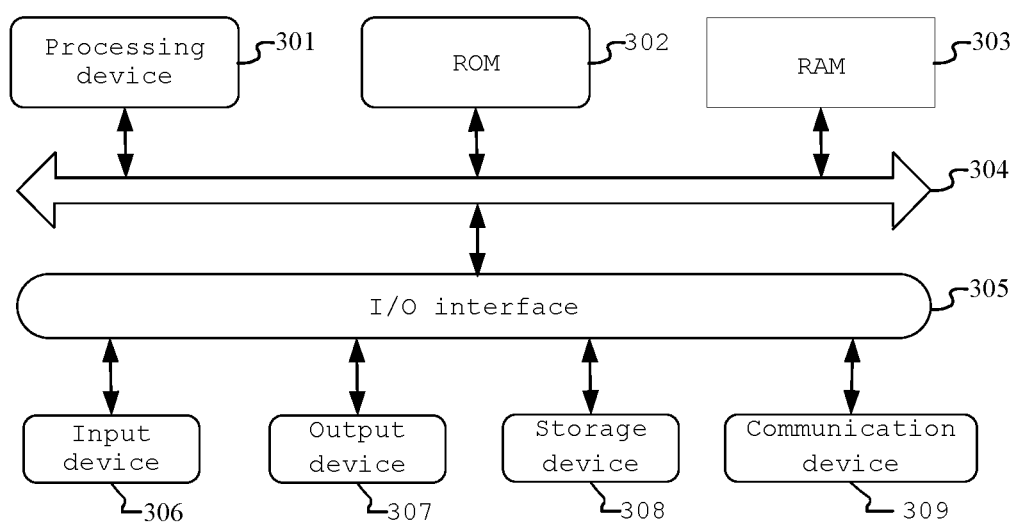
FIG. 14 is a block diagram illustrating an electronic device in accordance with an exemplary embodiment.

Reference is made below to FIG. 14, which illustrates a schematic structural diagram of an electronic device 300 (for example, an execution body for the above method for synchronizing audio and text) suitable for implementing an embodiment of the present disclosure. A terminal device in the embodiment of the present disclosure can include, but is not limited to, a mobile terminal such as a mobile phone, a notebook computer, a digital broadcast receiver, a PDA (Personal Digital Assistant), a PAD (tablet computer), a PMP (Portable Multimedia Player), a vehicle-mounted terminal (for example, a vehicle-mounted navigation terminal), and the like, and a fixed terminal such as a digital TV, a desktop computer, and the like. The electronic device shown in FIG. 14 is only one example, and should not bring any limitation to the function and the use scope of the embodiment of the present disclosure.

As shown in FIG. 14, the electronic device 300 can comprise a processing device (for example, a central processing unit, a graphics processing unit, etc.) 301, which can perform various appropriate actions and processes in accordance with a program stored in a read-only memory (ROM) 302 or a program loaded from a storage device 308 into a random access memory (RAM) 303. In the RAM 303, various programs and data necessary for the operation of the electronic apparatus 300 are also stored. The processing device 301, the ROM 302, and the RAM 303 are connected to each other through a bus 304. An input/output (I/O) interface 305 is also connected to the bus 304.

Generally, the following devices can be connected to the I/O interface 305: an input device 306 including, for example, a touch screen, touch pad, keyboard, mouse, camera, microphone, accelerometer, gyroscope, and the like; an output device 307 including, for example, a liquid crystal display (LCD), a speaker, a vibrator, and the like; the storage device 308 including, for example, a magnetic tape, a hard disk, and the like; and a communication device 309. The communication device 309 can allow the electronic device 300 to be in wireless or wired communication with another device to exchange data. While FIG. 14 illustrates the electronic device 300 having various devices, it should be understood that not all illustrated devices are required to be implemented or provided. More or fewer devices can be alternatively implemented or provided.

In particular, in accordance with the embodiment of the present disclosure, the process described above with reference to the flow diagram can be implemented as a computer software program. For example, an embodiment of the present disclosure comprises a computer program product, which comprises a computer program carried on a non-transitory computer-readable medium, the computer program containing program code for performing the method illustrated by the flow diagram. In such an embodiment, the computer program can be downloaded and installed from a network through the communication device 309, or installed from the storage device 308, or installed from the ROM 302. The computer program, when executed by the processing device 301, performs the above function defined in the method of the embodiment of the present disclosure.

It should be noted that the above computer-readable medium of the present disclosure can be a computer-readable signal medium or a computer-readable storage medium or any combination of the two. The computer-readable storage medium can be, for example, but not limited to, an electronic, magnetic, optical, electromagnetic, infrared, or semiconductor system, apparatus, or device, or any suitable combination of the above. More specific examples of the computer-readable storage medium can include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium that can contain or store a program which can be used by or in conjunction with an instruction execution system, apparatus, or device. However, in the present disclosure, the computer-readable signal medium can include a data signal propagated in baseband or as part of a carrier wave, which has computer-readable program code carried therein. Such a propagated data signal can take a variety of forms, including, but not limited to, an electromagnetic signal, an optical signal, or any suitable combination of the above. The computer-readable signal medium can be any computer-readable medium other than the computer-readable storage medium, and the computer-readable signal medium can send, propagate, or transmit a program for use by or in conjunction with an instruction execution system, apparatus, or device. Program code contained on the computer-readable medium can be transmitted using any appropriate medium, including but not limited to: a wire, an optical cable, RF (radio frequency), etc., or any suitable combination of the above.

In some embodiments, the terminal device and the server can communicate using any currently known or future developed network protocol, such as HTTP (HyperText Transfer Protocol), and can be interconnected with any form or medium of digital data communication (for example, a communication network). Examples of the communication network include a local area network ("LAN"), a wide area network ("WAN"), an internet (for example, the Internet), and a peer-to-peer network (for example, an ad hoc peer-to-peer network), as well as any currently known or future developed network.

The above computer-readable medium can be contained in the above electronic device; or can be separate and not assembled into the electronic device.

The above computer-readable medium has thereon carried one or more programs which, when executed by the electronic device, enables the electronic device to: in response to a first page displayed on a presentation interface being updated to a second page, determine whether the second page comprises multimedia content, wherein audio corresponding to text in the first page is played while the first page is displayed; if the second page comprises the multimedia content and the multimedia content is in a mute playing state, control the audio to be played continuously; determine a first playing identification of the audio when the playing of the multimedia content is stopped, and determine corresponding target text in accordance with the first playing identification; and update the second page to a third page on the presentation interface, the third page comprising the target text.

Computer program code for performing operations of the present disclosure can be written in one or more programming languages or a combination thereof, wherein the programming language includes but is not limited to an object-oriented programming language such as Java, Smalltalk, C++, and includes a conventional procedural programming language, such as the "C" language or a similar programming language. The program code can be executed entirely on a user's computer, partly on the user's computer, as a stand-alone software package, partly on the user's computer and partly on a remote computer, or entirely on the remote computer or the server. In a scene where a remote computer is involved, the remote computer can be connected to the user's computer through any type of network, including a local area network (LAN) or a wide area network (WAN), or can be connected to an external computer (for example, through the Internet using an Internet service provider).

The flow diagrams and the block diagrams in the accompanying drawings illustrate the possibly implemented architectures, functions, and operations of the system, method and computer program product in accordance with various embodiments of the present disclosure. In this regard, each block in the flow diagram or block diagram can represent one module, segment, or portion of code, which comprises one or more executable instructions for implementing the specified logical function. It should also be noted that, in some alternative implementations, functions annotated in the block can occur in a different order from those annotated in the drawings. For example, two blocks shown in succession can, in fact, be executed substantially in parallel, or they can sometimes be executed in a reverse order, which depends upon functions involved. It will also be noted that each block in the block diagrams and/or flow diagrams, and a combination of blocks in the block diagrams and/or flow diagrams, can be implemented with a special-purpose hardware-based system that perform the specified function or operation, or with a combination of special-purpose hardware and computer instructions.

The involved module described in the embodiments of the present disclosure can be implemented by software or hardware. The name of the module does not constitute a limitation on the module itself under a certain circumstance, for example, the first determination module can also be described as a "module that determines whether a page comprises multimedia content".

The functions described above herein can be performed, at least in part, by one or more hardware logic components.

For example, without limitation, an exemplary type of hardware logic component that can be used includes: a field programmable gate array (FPGA), application specific integrated circuit (ASIC), application specific standard product (ASSP), system-on-a-chip (SOC), complex programmable logic device (CPLD), and the like.

In the context of this disclosure, a machine-readable medium can be a tangible medium, which can contain or store a program for use by or in conjunction with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the above. More specific examples of the machine-readable storage medium can include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

In accordance with one or more embodiments of the present disclosure, Example 1 provides a method for synchronizing audio and text, comprising: in response to a first page displayed on a presentation interface being updated to a second page, determining whether the second page comprises multimedia content, wherein audio corresponding to text in the first page is played while the first page is displayed; if the second page comprises the multimedia content and the multimedia content is in a mute playing state, controlling the audio to be played continuously; determining a first playing identification of the audio when the playing of the multimedia content is stopped, and determining corresponding target text in accordance with the first playing identification; and updating the second page to a third page on the presentation interface, the third page comprising the target text.

In accordance with one or more embodiments of the present disclosure, Example 2 provides the method of the Example 1, wherein the first playing identification comprises a playing time identification, and the determining corresponding target text in accordance with the first playing identification comprises: determining, in a preset first mapping relation, a first mapping record matched with the playing time identification, wherein the first mapping relation comprises at least one mapping record which comprises a correspondence between the text and a playing time range of the audio, and the playing time identification falls within the playing time range in the first mapping record; and determining the target text in accordance with the first mapping record.

In accordance with one or more embodiments of the present disclosure, Example 3 provides the method of the Example 1, wherein the audio comprises at least one audio file, the first playing identification comprises a playing time identification and an audio identification, and the determining corresponding target text in accordance with the first playing identification comprises: determining, in a preset second mapping relation, a second mapping record matched with the audio identification, wherein the second mapping relation comprises at least one mapping record which comprises a correspondence between the audio file and segmentation text, and a target audio file indicated by the audio identification is the audio file in the second mapping record; determining target segmentation text in accordance with the second mapping record; determining, in a preset third mapping relation, a third mapping record matched with the playing time identification, wherein the third mapping relation comprises at least one mapping record which comprises a correspondence between text in the target segmentation text and a playing time range of the target audio file, and the playing time identification falls within the playing time range in the third mapping record; and determining the target text in the target segmentation text in accordance with the third mapping record.

In accordance with one or more embodiments of the present disclosure, Example 4 provides the method of the Examples 1 to 3, the method further comprising: determining first text corresponding to a second playing identification in accordance with the second playing identification of the audio when the first page is presented on the presentation interface; determining whether a last preset number of elements in the first text are presented in a target region of the presentation interface; if the last preset number of elements in the first text are not presented in the target region, determining a target ratio of elements in the first text that are presented in the target region to elements comprised in the first text; and determining whether the first page is updated to the second page in accordance with the second playing identification and the target ratio.

In accordance with one or more embodiments of the present disclosure, Example 5 provides the method of the Example 4, the method further comprising: determining whether an element in the first text is presented in the presentation interface; and the determining whether a last preset number of elements in the first text are presented in a target region of the presentation interface comprising: if any element in the first text is presented in the presentation interface, determining whether the last preset number of elements in the first text are presented in the target region.

In accordance with one or more embodiments of the present disclosure, Example 6 provides the method of the Examples 1 to 5, the method further comprising: if the second page comprises the multimedia content and the multimedia content is not in a playing state, controlling the multimedia content to be played on the presentation interface for a preset duration.

In accordance with one or more embodiments of the present disclosure, Example 7 provides the method of the Examples 1 to 5, the method further comprising: if the second page comprises the multimedia content and a page-turning instruction is received, updating the second page to a fourth page on the presentation interface, the fourth page comprising second text indicated by the page-turning instruction.

In accordance with one or more embodiments of the present disclosure, Example 8 provides the method of the Examples 1 to 7, wherein the updating the second page to a third page on the presentation interface comprises: replacing the second page with the third page on the presentation interface in accordance with a preset page-turning effect, the preset page-turning effect comprising: any of page-turning animation, overlay animation, and translation animation; or, scrolling from the second page to the third page on the presentation interface in accordance with a preset speed.

In accordance with one or more embodiments of the present disclosure, Example 9 provides the method of the Examples 1 to 8, wherein the audio corresponding to text in the first page being played while the first page is displayed specifically comprises: determining third text corresponding to a third playing identification in accordance with the third playing identification of the audio when the first page is presented on the presentation interface; and marking the third text in accordance with a preset display mode on the presentation interface, the preset display mode comprising: at least one of highlight display, underline display, or bold display.

In accordance with one or more embodiments of the present disclosure, Example 10 provides an apparatus for synchronizing audio and text, comprising: modules for performing the method according to the Examples 1 to 9.

In accordance with one or more embodiments of the present disclosure, Example 11 provides a non-transitory computer-readable medium having thereon stored a computer program which, when executed by a processing device, implements the method according to the Examples 1 to 9.

In accordance with one or more embodiments of the present disclosure, Example 12 provides an electronic device, comprising: a storage device having thereon stored a computer program; and a processing device configured to execute the computer program in the storage device to implement the method according to the Examples 1 to 9.

In accordance with one or more embodiments of the present disclosure, Example 13 provides a computer program which, when executed by a processing device, implements the method according to the Examples 1 to 9.

In accordance with one or more embodiments of the present disclosure, Example 14 provides a computer program product having thereon stored a computer program which, when executed by a processing device, implements the method according to the Examples 1 to 9.

The above description is only preferred embodiments of the present disclosure and an explanation of applied technical principles. It should be appreciated by those skilled in the art that the disclosure scope involved in this disclosure is not limited to a technical solution formed by a specific combination of the above technical features, but also covers other technical solutions formed by an arbitrary combination of the above technical features or their equivalent features without departing from the above concept of the disclosure. The technical solution is, for example, a technical solution formed by replacing the above features with technical features having functions similar to those disclosed(but not limited to) in the present disclosure.

Furthermore, while operations are depicted in a specific order, this should not be understood as requiring that such operations be performed in the specific order shown or in a sequential order. Under certain circumstances, multitasking and parallel processing may be advantageous. Similarly, while several specific implementation details are included in the above discussion, these should not be construed as limitations on the scope of the present disclosure. Certain features that are described in the context of separate embodiments can also be implemented in a single embodiment in combination. Conversely, various features that are described in the context of a single embodiment can also be implemented in multiple embodiments separately or in any suitable sub-combination.

Although the subject matter has been described in terms specific to structural features and/or method logic actions, it should be understood that the subject matter defined in the attached claims is not necessarily limited to the specific features or actions described above. Conversely, the specific features and actions described above are only example forms of implementing the claims. With regard to the apparatus in the above embodiment, the specific manner in which each module performs the operation has been described in detail in the embodiments related to the method, which will not be described in detail here.

What is claimed is:

1. A method for synchronizing audio and text, comprising:
   playing the audio while displaying corresponding text in a first page on a presentation interface;
   in response to the first page being updated to a second page, determining whether the second page comprises multimedia content;
   in response to determining that the second page comprises the multimedia content and the multimedia content is in a mute playing state, controlling the audio to be played continuously, wherein the multimedia content does not belong to the audio and the text, and the multimedia content interferes with synchronization between the audio and the text;
   determining a first playing identification of the audio in response to determining that playing of the multimedia content is stopped;
   determining target text based on the first playing identification of the audio; and
   updating the second page to a third page on the presentation interface, and synchronously playing the audio and displaying the target text in the third page.

2. The method according to claim 1, wherein the first playing identification comprises a playing time identification, and the determining corresponding target text in accordance with the first playing identification comprises:
   determining, in a preset first mapping relation, a first mapping record matched with the playing time identification, wherein the first mapping relation comprises at least one mapping record which comprises a correspondence between the text and a playing time range of the audio, and the playing time identification falls within the playing time range in the first mapping record; and
   determining the target text in accordance with the first mapping record.

3. The method according to claim 1, wherein the audio comprises at least one audio file, the first playing identification comprises a playing time identification and an audio identification, and the determining corresponding target text in accordance with the first playing identification comprises:
   determining, in a preset second mapping relation, a second mapping record matched with the audio identification, wherein the second mapping relation comprises at least one mapping record which comprises a correspondence between the audio file and segmentation text, and a target audio file indicated by the audio identification is the audio file in the second mapping record;
   determining target segmentation text in accordance with the second mapping record;
   determining, in a preset third mapping relation, a third mapping record matched with the playing time identification, wherein the third mapping relation comprises at least one mapping record which comprises a correspondence between text in the target segmentation text and a playing time range of the target audio file, and the playing time identification falls within the playing time range in the third mapping record; and
   determining the target text in the target segmentation text in accordance with the third mapping record.

4. The method according to claim 1, wherein the method further comprises:
   determining first text corresponding to a second playing identification in accordance with the second playing identification of the audio when the first page is presented on the presentation interface;
determining whether a last preset number of elements in the first text are presented in a target region of the presentation interface;
if the last preset number of elements in the first text are not presented in the target region, determining a target ratio of elements in the first text that are presented in the target region to elements comprised in the first text; and
determining whether the first page is updated to the second page in accordance with the second playing identification and the target ratio.

5. The method according to claim 4, wherein the method further comprises:
determining whether an element in the first text is presented in the presentation interface; and
the determining whether a last preset number of elements in the first text are presented in a target region of the presentation interface comprises:
if any element in the first text is presented in the presentation interface, determining whether the last preset number of elements in the first text are presented in the target region.

6. The method according to claim 1, wherein the method further comprises:
if the second page comprises the multimedia content and the multimedia content is not in a playing state, controlling the multimedia content to be played on the presentation interface for a preset duration.

7. The method according to claim 1, wherein the method further comprises:
if the second page comprises the multimedia content and a page-turning instruction is received, updating the second page to a fourth page on the presentation interface, the fourth page comprising second text indicated by the page-turning instruction.

8. The method according to claim 1, wherein the updating the second page to a third page on the presentation interface comprises:
replacing the second page with the third page on the presentation interface in accordance with a preset page-turning effect, the preset page-turning effect comprising: any of page-turning animation, overlay animation, and translation animation; or, scrolling from the second page to the third page on the presentation interface in accordance with a preset speed.

9. The method according to claim 1, wherein the audio corresponding to text in the first page being played while the first page is displayed specifically comprises:
determining third text corresponding to a third playing identification in accordance with the third playing identification of the audio when the first page is presented on the presentation interface; and
marking the third text in accordance with a preset display mode on the presentation interface, the preset display mode comprising: at least one of highlight display, underline display, or bold display.

10. A non-transitory computer-readable medium having thereon stored a computer program which, when executed by a processing device, implements operations comprising:
playing the audio while displaying corresponding text in a first page on a presentation interface;
in response to the first page being updated to a second page, determining whether the second page comprises multimedia content;
in response to determining that the second page comprises the multimedia content and the multimedia content is in a mute playing state, controlling the audio to be played continuously, wherein the multimedia content does not belong to the audio and the text, and the multimedia content interferes with synchronization between the audio and the text;
determining a first playing identification of the audio in response to determining that playing of the multimedia content is stopped;
determining target text based on the first playing identification of the audio; and
updating the second page to a third page on the presentation interface, and synchronously playing the audio and displaying the target text in the third page.

11. The non-transitory computer-readable medium according to claim 10, wherein the first playing identification comprises a playing time identification, and the determining corresponding target text in accordance with the first playing identification comprises:
determining, in a preset first mapping relation, a first mapping record matched with the playing time identification, wherein the first mapping relation comprises at least one mapping record which comprises a correspondence between the text and a playing time range of the audio, and the playing time identification falls within the playing time range in the first mapping record; and
determining the target text in accordance with the first mapping record.

12. The non-transitory computer-readable medium according to claim 10, wherein the audio comprises at least one audio file, the first playing identification comprises a playing time identification and an audio identification, and the determining corresponding target text in accordance with the first playing identification comprises:
determining, in a preset second mapping relation, a second mapping record matched with the audio identification, wherein the second mapping relation comprises at least one mapping record which comprises a correspondence between the audio file and segmentation text, and a target audio file indicated by the audio identification is the audio file in the second mapping record;
determining target segmentation text in accordance with the second mapping record;
determining, in a preset third mapping relation, a third mapping record matched with the playing time identification, wherein the third mapping relation comprises at least one mapping record which comprises a correspondence between text in the target segmentation text and a playing time range of the target audio file, and the playing time identification falls within the playing time range in the third mapping record; and
determining the target text in the target segmentation text in accordance with the third mapping record.

13. The non-transitory computer-readable medium according to claim 10, wherein the computer program, when executed by the processing device, further implements the operations of:
determining first text corresponding to a second playing identification in accordance with the second playing identification of the audio when the first page is presented on the presentation interface;
determining whether a last preset number of elements in the first text are presented in a target region of the presentation interface;
if the last preset number of elements in the first text are not presented in the target region, determining a target ratio of elements in the first text that are presented in the target region to elements comprised in the first text; and determining whether the first page is updated to the second page in accordance with the second playing identification and the target ratio.

14. The non-transitory computer-readable medium according to claim 13, wherein the computer program, when executed by the processing device, further implements the operations of:

determining whether an element in the first text is presented in the presentation interface; and the determining whether a last preset number of elements in the first text are presented in a target region of the presentation interface comprises:

if any element in the first text is presented in the presentation interface, determining whether the last preset number of elements in the first text are presented in the target region.

15. The non-transitory computer-readable medium according to claim 10, wherein the computer program, when executed by the processing device, further implements the operations of:

if the second page comprises the multimedia content and the multimedia content is not in a playing state, controlling the multimedia content to be played on the presentation interface for a preset duration.

16. The non-transitory computer-readable medium according to claim 10, wherein the computer program, when executed by the processing device, further implements the operations of:

if the second page comprises the multimedia content and a page-turning instruction is received, updating the second page to a fourth page on the presentation interface, the fourth page comprising second text indicated by the page-turning instruction.

17. The non-transitory computer-readable medium according to claim 10, wherein the updating the second page to a third page on the presentation interface comprises:

replacing the second page with the third page on the presentation interface in accordance with a preset page-turning effect, the preset page-turning effect comprising: any of page-turning animation, overlay animation, and translation animation; or, scrolling from the second page to the third page on the presentation interface in accordance with a preset speed.

18. The non-transitory computer-readable medium according to claim 10, wherein the audio corresponding to text in the first page being played while the first page is displayed specifically comprises:

determining third text corresponding to a third playing identification in accordance with the third playing identification of the audio when the first page is presented on the presentation interface; and marking the third text in accordance with a preset display mode on the presentation interface, the preset display mode comprising: at least one of highlight display, underline display, or bold display.

19. An electronic device, comprising:

a storage device having thereon stored a computer program; and a processing device configured to execute the computer program in the storage device, to implement operations comprising:

playing the audio while displaying corresponding text in a first page on a presentation interface;

in response to the first page being updated to a second page, determining whether the second page comprises multimedia content;

in response to determining that the second page comprises the multimedia content and the multimedia content is in a mute playing state, controlling the audio to be played continuously, wherein the multimedia content does not belong to the audio and the text, and the multimedia content interferes with synchronization between the audio and the text;

determining a first playing identification of the audio in response to determining that playing of the multimedia content is stopped;

determining target text based on the first playing identification of the audio; and updating the second page to a third page on the presentation interface, and synchronously playing the audio and displaying the target text in the third page.

* * * * *